US007336957B2

(12) United States Patent
Marinier et al.

(10) Patent No.: US 7,336,957 B2
(45) Date of Patent: Feb. 26, 2008

(54) SYSTEM AND METHOD FOR SIMULATION OF PERFORMANCE OF MEASUREMENT-BASED ALGORITHMS FOR SLOTTED WIRELESS COMMUNICATIONS

(75) Inventors: Paul Marinier, Brossard (CA); Eldad Zeira, Huntington, NY (US); Frank La Sita, East Setauket, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 314 days.

(21) Appl. No.: 10/680,376

(22) Filed: Oct. 7, 2003

(65) Prior Publication Data

US 2004/0116127 A1 Jun. 17, 2004

Related U.S. Application Data

(60) Provisional application No. 60/417,070, filed on Oct. 7, 2002.

(51) Int. Cl.
H04Q 7/20 (2006.01)
(52) U.S. Cl. .................. 455/450; 455/522; 455/435.2; 455/452.1
(58) Field of Classification Search ................ 455/522, 455/509, 515, 450, 66.11, 115.1, 453, 452.1, 455/435.2
See application file for complete search history.

(56) References Cited

U.S. PATENT DOCUMENTS

| | | | |
|---|---|---|---|
| 5,551,057 A * | 8/1996 | Mitra ........................ 455/522 |
| 6,078,812 A * | 6/2000 | Mintz ........................ 455/434 |
| 6,085,335 A * | 7/2000 | Djoko et al. .................. 714/26 |
| 6,351,650 B1 | 2/2002 | Lundby et al. |
| 6,704,286 B2 | 3/2004 | Zeira et al. |
| 6,757,542 B2 * | 6/2004 | Bruin et al. ................. 455/453 |
| 6,775,233 B1 * | 8/2004 | Kumaran et al. ......... 370/230.1 |
| 6,876,857 B1 * | 4/2005 | Nee et al. .................... 455/450 |
| 6,934,268 B1 * | 8/2005 | Hedlund et al. ............ 370/311 |
| 6,987,729 B1 * | 1/2006 | Gopalakrishnan et al. .. 370/230 |
| 2002/0082013 A1 * | 6/2002 | Lee et al. .................... 455/436 |
| 2002/0102984 A1 * | 8/2002 | Furuskar et al. ............ 455/452 |
| 2002/0119796 A1 * | 8/2002 | Vanghi ........................ 455/522 |
| 2002/0176360 A1 * | 11/2002 | Racz et al. .................. 370/230 |
| 2002/0181394 A1 * | 12/2002 | Partain et al. .............. 370/229 |
| 2003/0060209 A1 * | 3/2003 | Bruin et al. ................. 455/452 |
| 2003/0064741 A1 * | 4/2003 | Silva et al. .................. 455/522 |
| 2003/0148768 A1 * | 8/2003 | Kakani et al. .............. 455/452 |
| 2004/0063434 A1 * | 4/2004 | Hamalainen et al. ....... 455/450 |
| 2004/0162082 A1 * | 8/2004 | Bacceli et al. .............. 455/453 |

\* cited by examiner

*Primary Examiner*—Rafael Perez-Gutierrez
*Assistant Examiner*—Kwasi Karikari
(74) *Attorney, Agent, or Firm*—Volpe and Koenig, P.C.

(57) ABSTRACT

A simulation is used to determine the effect of additional users on a communications system, such as a slotted wireless communications system. Users are sequentially added and determinations are made as to whether criteria for the additional user fall within predetermined limits. If the criteria are met, the user is accepted by the simulation and a power balancing is performed for all users. The simulation is repeated for each additional user. If the parameters are not within predetermined limits, the user is dropped. The simulation presents the system in a series of "snapshots" of communications activity.

12 Claims, 4 Drawing Sheets

SYSTEM AND METHOD FOR SIMULATION OF PERFORMANCE OF MEASUREMENT-BASED ALGORITHMS FOR SLOTTED WIRELESS COMMUNICATIONS

CROSS REFERENCE TO RELATED APPLICATION(S)

This application claims priority from U.S. provisional application No. 60/417,070 filed on Oct. 7, 2002, which is incorporated by reference as if fully set forth.

FIELD OF INVENTION

The present invention relates to simulation of wireless communication systems. More particularly, the present invention relates to a system and method for performing simulations to evaluate the performance of resource allocation algorithms in a slotted communication system.

BACKGROUND

Current mobile radio communication systems rely on sophisticated radio resource management algorithms to maximize their performance in terms of capacity, coverage, and network stability. System designers generally employ computer-based simulation techniques to estimate the benefit of specific algorithms prior to implementing them in an actual system. However, since a mobile radio system involves multiple transmitters and receivers interacting with each other, it is difficult to predict the performance gains of some of those schemes in an analytical manner.

One widely known current source of information on system-level simulations of mobile radio systems is a technical report of the third generation partnership project (3GPP), that contains the basic methodology for static snapshot-based simulation of wireless systems. The term "static" means that modeling of dynamic effects due to movement of users, call arrival and departures is not attempted. Rather, simulation of possible realizations of the system configuration in terms of user placement ("i.e. snapshots") is performed at specific instants of time. In each snapshot, the transmission power requirements of each user are computed by iterative power balancing where the mutual interference between users is modeled. It is then found whether or not users can sustain a viable connection; for example, if there is a sufficient signal-to-interference ratio (SIR). If not, those events are recorded for statistical analysis. These simulations also permit extraction of other statistics, such as distributions of transmission power, interference levels, etc. The accuracy of those statistics improves as the number of simulated snapshots increases.

There are several radio resource management algorithms that are used in the prior art. For example, those algorithms that are responsible for the user-to-timeslot allocation, (also known as fast dynamic channel allocation (F-DCA)), are particularly critical to the performance of time slotted communication systems. Although some aspects of the prior art methodology are generally applicable to the simulation of time division duplex (TDD) systems, this methodology falls far short of what is required to evaluate the performance of measurement-based F-DCA algorithms.

Measurement-based F-DCA algorithms base the timeslot allocation or re-allocation decision for a given user on interference, received power (path loss) and transmission power measurements performed by the mobile unit and its serving base station in all candidate timeslots. When the performance of an F-DCA algorithm is simulated, prior to each invocation the program must provide the simulated F-DCA algorithm with the interference and transmission power levels that would be reported by the relevant nodes of the system. Additionally, all users are allocated a channel before the start of the power balancing procedure. However, those levels are not available before the power balancing procedure is executed. Since the interference and transmission power levels are not available prior to the channel allocation, this type of methodology fails to perform any meaningful validation of an F-DCA algorithm.

SUMMARY

The present invention is a system and method for simulating a multi-user time-slotted communication system. Each potential user is individually analyzed to determine whether the addition of that user will adversely impact the interference levels within each timeslot. If the new potential user does not introduce a unacceptable level of interference in any of the timeslots, the user is admitted. Once the new user is admitted, a power balancing is performed on each of the slots and time slots are reallocated between users as necessary. This process is repeated for each new potential user seeking entry into the system.

DETAILED DESCRIPTION OF THE PREFERRED EMBODIMENTS

Figure 1:
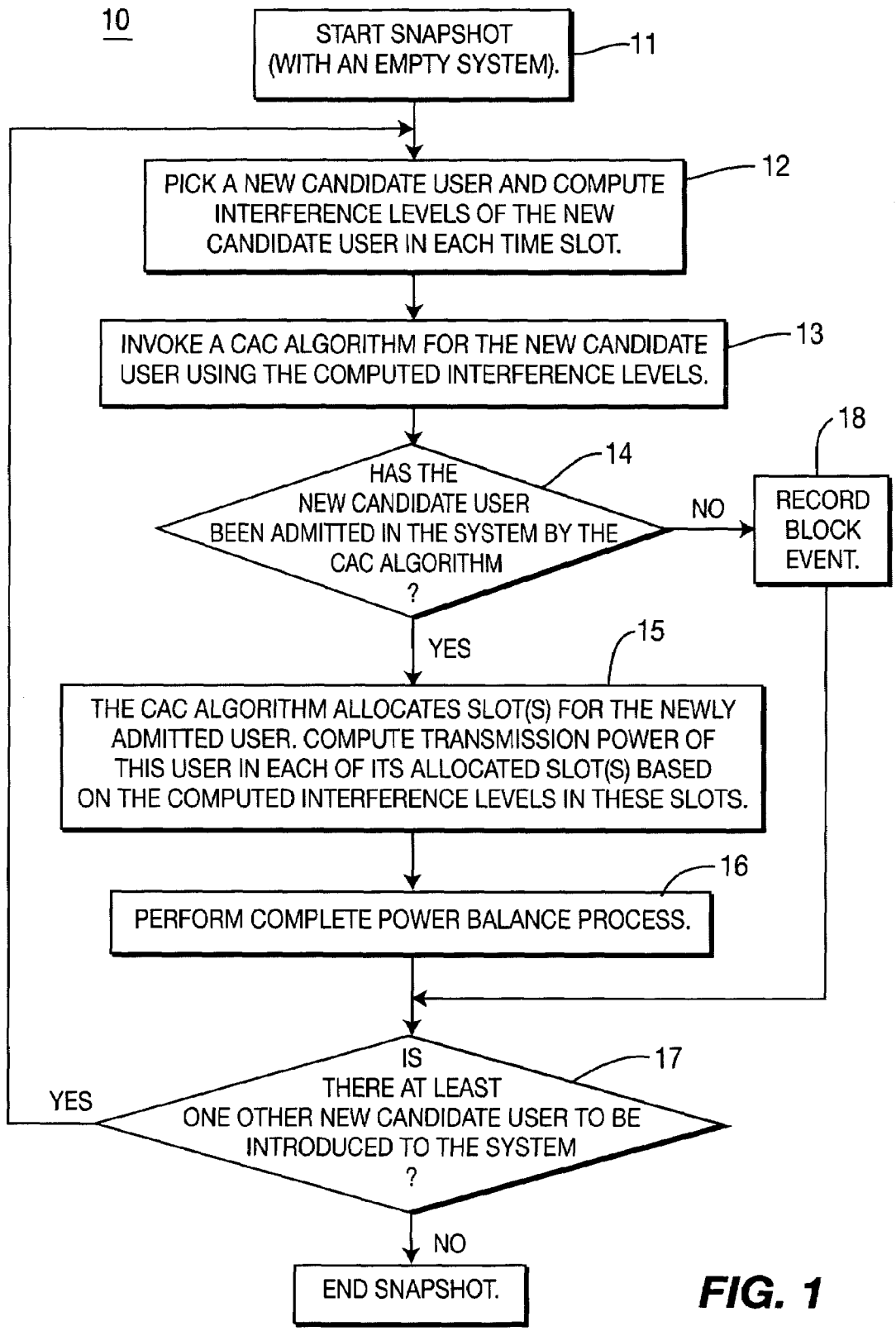
FIG. 1 is a flow diagram of the method for validating a Call Admission Control algorithm in accordance with one embodiment of the present invention.

The present invention will be described with reference to the drawing figures wherein like numerals represent like elements throughout.

The present invention is applicable to the evaluation of all slotted wireless communications. For simplicity in describing the present invention, the invention will be described for use with a 3GPP communication system utilizing the TDD mode. However, the invention is applicable to many different types of wireless communication systems.

As used hereinafter, the terminology "wireless transmit/receive unit" (WTRU) includes, but is not limited to, a user, user equipment, mobile station, fixed or mobile subscriber unit, or any other type of device capable of operating in a wireless environment. As used hereinafter, the terminology "Node B" includes, but is not limited to, a base station, site controller, access point or other interfacing device in a wireless environment. While base-to-mobile transmissions will be described hereinafter, the inventive concepts are also applicable to peer-to-peer communications.

The following describes briefly several examples of functions of the different F-DCA algorithms that can be validated. These algorithms are well known to those of skill in the art. This is not an exhaustive list and it should be understood by those of skill in the art that the present methodology may be applied to simulate or validate many other algorithms. These algorithms base the timeslot allocation or re-allocation decision for a given user on interference, received power (path loss) and transmission power measurements performed by a WTRU and/or its serving Node B in all candidate timeslots. The referenced example algorithms which are validated are:

1. F-DCA Call admission control (CAC) algorithm, which is responsible for allocating additional dedicated physical channels to a user that was possibly not occupying any dedicated physical channels. The algorithm can also deny access to any additional physical channel if it evaluates that the connection would be unsustainable. The algorithm is also utilized if a user already has a low bit rate connection and wants to use a higher bit rate connection requiring more dedicated channels.

2. Background algorithm, which periodically revises the channel allocations of all users. The physical channel allocation of a user may be changed if the algorithm predicts that this would result in a gain in terms of system performance, (e.g., reduced interference).

3. Escape algorithm, which attempts to change the physical channel allocation of a user experiencing excessive interference, or occupying a timeslot where there is a shortage of base station transmission power in the downlink.

The simulation method for these validations includes performing a large number of snapshots, in which a certain number of users are randomly introduced in the system. Statistics are collected over all snapshots and subsequently analyzed to obtain performance metrics for the system.

Referring to FIG. 1, a flow diagram of the method 10 for validating the CAC algorithm is shown. It should be noted that the method 10 applies to either the downlink (DL) or the uplink (UL). Additionally, in the following, it should be understood that "transmission power of a user" means, in the case of the DL, the power that the Node B serving the user must transmit in a given timeslot to support the connection. In the case of the UL, it means the power that the user must transmit in a given timeslot to support the connection. It should also be understood that "interference level of the user" means, in the case of the UL, the interference (including thermal noise) that the Node B serving (or potentially serving) the user perceives in a given timeslot. In the case of the DL, it means the interference (including thermal noise) that the user perceives in a given timeslot.

The method 10 starts the snapshot with a system where no user is present, (i.e., an empty system), (step 11). A new candidate user is picked and the interference levels of this user are calculated in each time slot (step 12). The transmission powers of already admitted users (if any) are used to perform this computation. The CAC algorithm is invoked (step 13) for the new candidate user, using the interference levels. It should be noted that the transmission power levels may also be utilized in step 13 depending on the specifics of the algorithm computed in step 12. It is then determined whether this new candidate user is admitted by the CAC algorithm (step 14). If the CAC algorithm has not admitted the new candidate user, this event is recorded as a "block" event (step 18) and the method 10 proceeds to step 17. If the CAC algorithm has admitted the new candidate user, the process continues to step 15. In step 15, the transmission power(s) of the newly admitted user in each of its allocated slots is computed, based on the interference levels computed in step 12. A complete power balancing process is then performed (step 16).

The power balancing process will be described in greater detail hereinafter with reference to FIG. 2. Generally, however, during the course of the power balancing process, some of the admitted users may be dropped by the system due to excessive interference or lack of transmission power. Each of these events is also recorded as a "drop" event for collecting statistics.

At the end of the power balancing process as summarized by step 16, the transmission powers of all admitted users are up-to-date. In step 17, it is determined whether there remains at least one new candidate user to be introduced in the system. If so, the method returns to step 12. Otherwise the snapshot is complete.

A complete simulation comprises the execution of a large number of snapshots. In each snapshot, key statistics such as the number of blocked users (step 18) and the number of dropped users (step 16) are recorded. The performance of the CAC algorithm is then characterized by the average percentage of users in a snapshot that have been blocked and dropped, for a given number of users that attempted to connect to the system at each snapshot. Typically, the number of users for which connection is attempted (e.g., offered users) is kept the same over all snapshots of a simulation. The lower the percentage of dropped or blocked users for a given number of offered users, the better performance the algorithm exhibits.

It should be noted that it often desired to study the performance of a channel allocation algorithm in a specific direction (i.e. UL or DL) only. In that case, the applicable simulations are performed for the specific direction. If it is desired to study both directions, then the simulations are performed separately for UL and DL. For a "joint" simulation, the simulations are done in both UL and DL, however, a user blocked or dropped in one direction would be considered to be blocked or dropped in the other direction.

Figure 2:
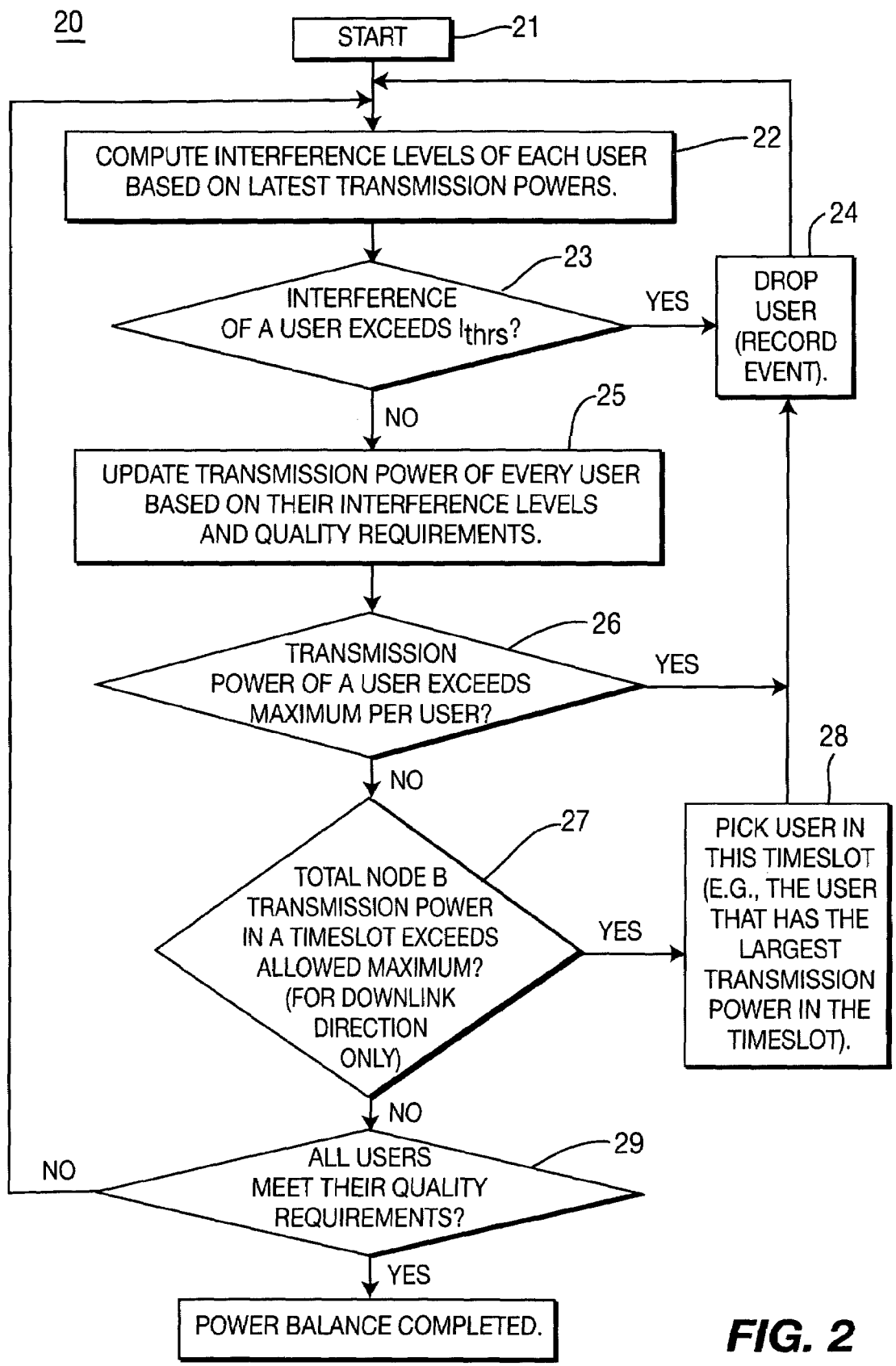
FIG. 2 is a flow diagram of a Power Balancing process implemented in accordance with the present invention.

Referring to the flow diagram of FIG. 2, a power balancing is performed in accordance with the present invention by executing the method 20 as shown. After the method 20 is commenced in step 21, the interference level of each user is computed, based on the latest computed transmission powers of all users, (step 22). It is then determined whether the interference level of any user exceeds a certain threshold ($I_{thrs}$) (step 23). If the interference level exceeds the threshold $I_{thrs}$, the user is dropped and the event is recorded as a "drop" event (step 24). The method 20 then returns to step 22. If the interference does not exceed the threshold $I_{thrs}$, the transmission power of every user is updated based on the interference levels and their quality requirements, (for example required signal-to-interference ratio), (step 25).

It is then determined whether the transmission power of any user exceeds the allowed maximum. If the transmission power of a user exceeds a maximum allowable level, the user is dropped, the event is recorded as a "drop" event (step 24) and the method 20 returns to step 22. If the transmission power of a user does not exceed the maximum allowable level, the method 20 proceeds to step 27. Step 27 applies to a simulation performed in the DL only. In case of an UL simulation, one proceeds directly to step 29. For a DL simulation, it is determined whether the total transmission power of a Node B in any timeslot exceeds the allowed maximum. If so, one of the users occupying the concerned timeslot is selected (step 28) and the user is dropped and the event is recorded as a "drop" event (step 24). Preferably, the selected user is the one that has the largest transmission power in the concerned timeslot.

If the total transmission power of a Node B does not exceed the maximum in any timeslot, the method 20 continues to step 29, where the connection quality of every user is evaluated. This is preferably performed by computing the signal-to-interference ratio (SIR). For example, a user meets its connection quality requirement if its SIR is within a certain window around the SIR target, (such as within 0.5 dB of the SIR target). If any user does not meet the connection quality requirement, the method 20 returns to step 22. Otherwise, the method 20 of power balancing is complete.

Figure 3:
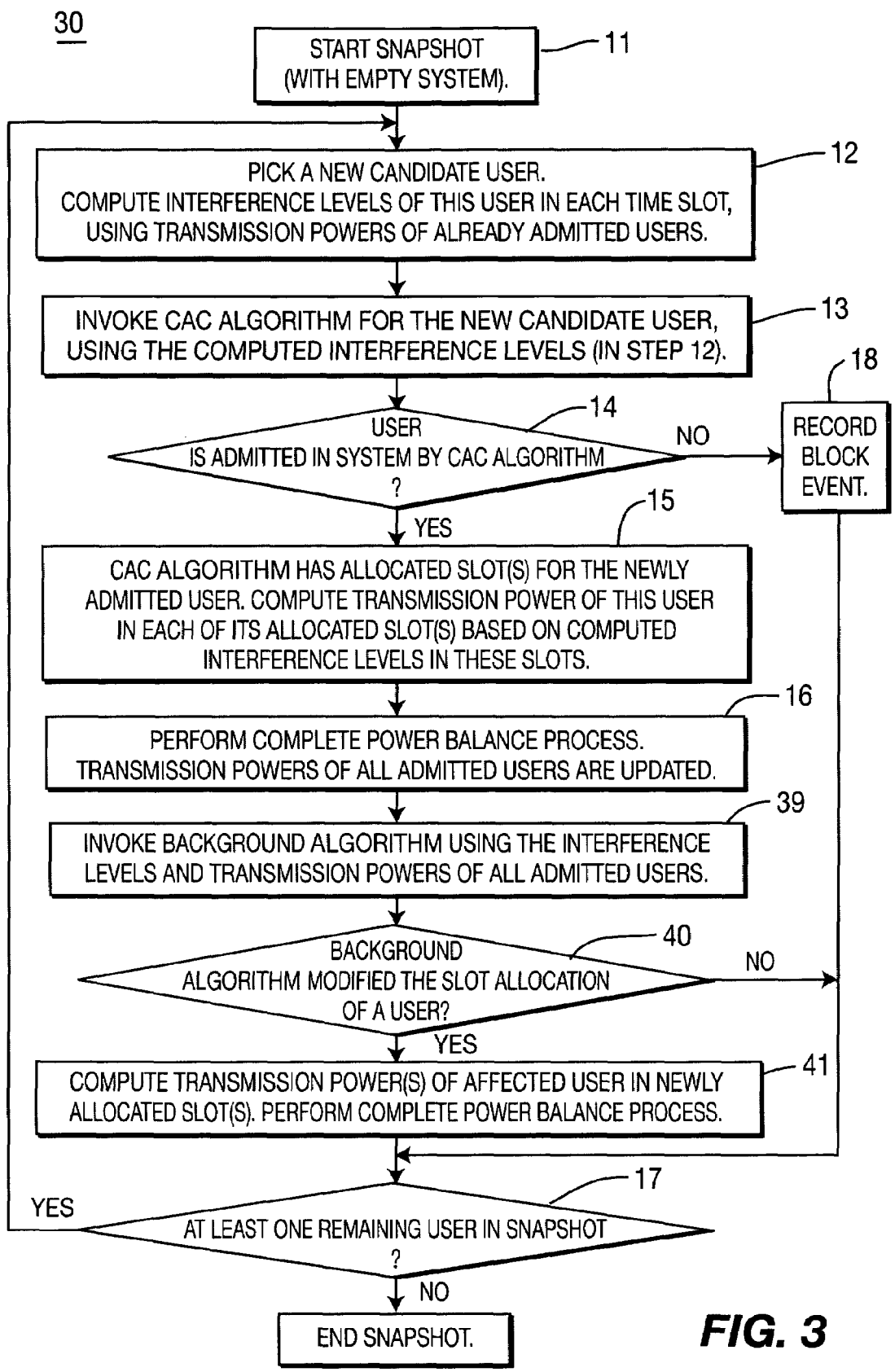
FIG. 3 is a flow diagram of the method for validating a Background algorithm in accordance with the present invention.

The method 30 for validating the performance of a Background algorithm will be described with reference to FIG. 3. This method 30 is similar to the method of validating the CAC algorithm (shown in FIG. 1), except that invoking the CAC algorithm with a new user is replaced from time to time by invoking the Background algorithm. It is preferable to alternate invoking the CAC and Background algorithms, although it is possible to try other sequences, (for example, the CAC algorithm is invoked three times for each time the Background algorithm is invoked, or vice-versa). Since certain steps shown in FIG. 3 are similar to certain steps shown in FIG. 1, these steps are identically numbered 11-17 and the description of these steps will not be repeated. However, new steps 39, 40 and 41 are additionally implemented to validate the Background algorithm.

Referring to step 39, following the completion of the power balancing process (step 16), the Background algorithm is invoked, using the transmission powers and interference levels of all users. It is then determined whether or not the Background algorithm has modified the slot allocation of any user. If not, the process 30 proceeds directly to step 17. Otherwise, the transmission power(s) of the affected user in its newly allocated slot(s) is computed, and a complete power balancing is performed (step 41). Step 17 is then entered to determine whether any new users need to be added. If so, step 12 is re-entered and the procedure 30 is repeated. If not, the snapshot is complete.

Figure 4:
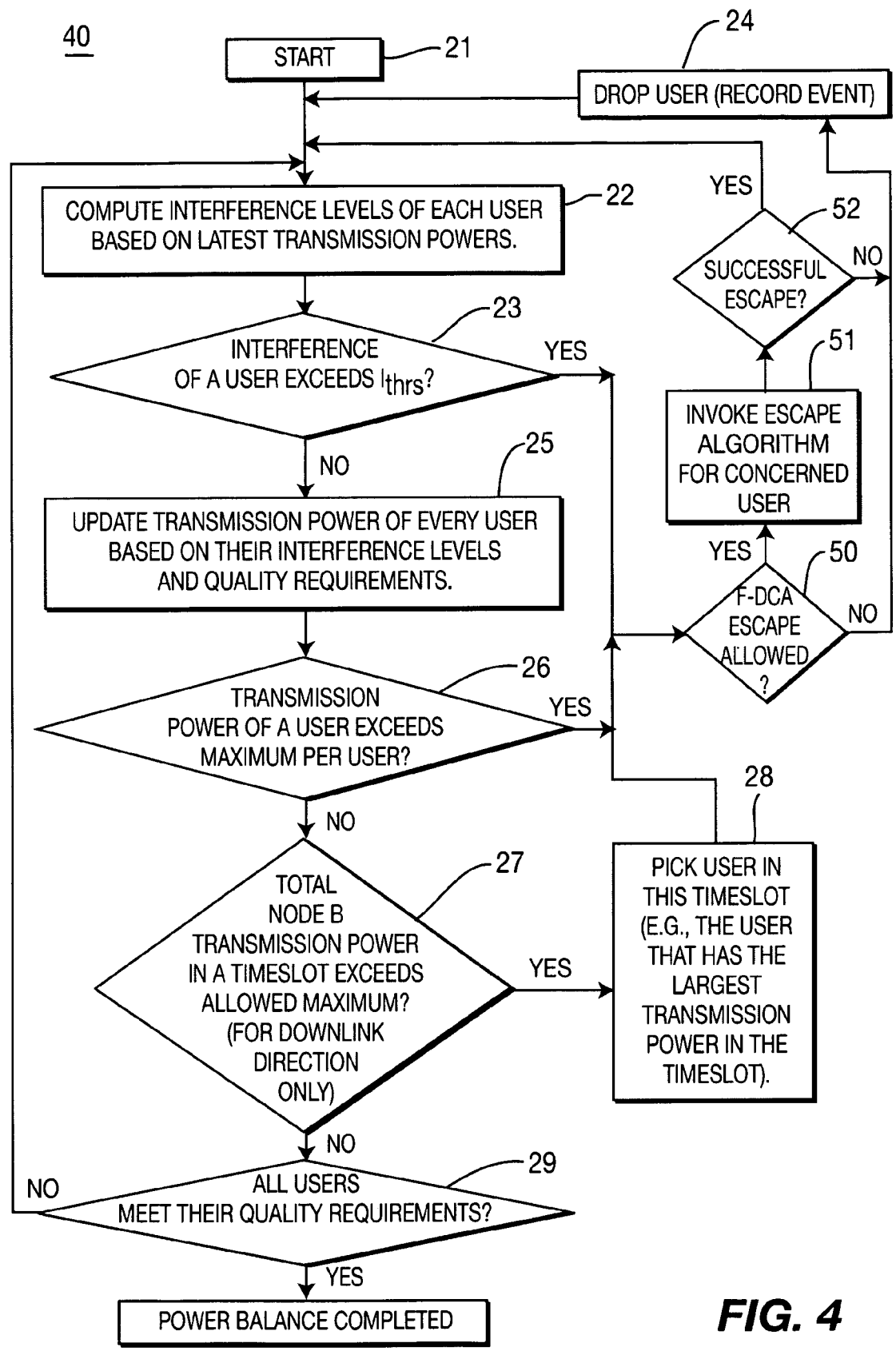
FIG. 4 is a flow diagram of the method for validating an Escape algorithm in accordance with the present invention.

Escape algorithm is validated by modifying the power balancing part of the snapshot to give an opportunity for users that would normally be dropped, (due to excessive interference, excessive user transmission power or excessive total base station transmission power), to be re-allocated to other physical channels. Validation of the Escape algorithm as implemented with power balancing is shown by the method 40 of FIG. 4. Since certain steps shown in FIG. 4 are similar to certain steps shown in FIG. 2, these steps are identically numbered 21-29 and the description of these steps will not be repeated. However, new steps 50, 51 and 52 are additionally implemented to validate the Escape algorithm.

Referring to step 23, if the interference of a user exceeds the threshold $I_{thrs}$, the Escape algorithm can be invoked for this user if allowed; (which is optional at step 50). It should be noted that invoking the Escape algorithm (step 51) is not required; it is optional. Should a system designer not desire this option at all, steps 50-52 will be eliminated and the method 40 of FIG. 4 will be the same as the method 20 of FIG. 2. However, as will be explained hereinafter, the Escape algorithm may be selectively invoked. Accordingly, the method 40 will be described as selectively providing this option.

The Escape algorithm is performed using the interference levels previously computed in step 22. The Escape algorithm attempts to find a new slot allocation for the concerned user. If this user's physical channels are moved to the new slots, the Escape is determined as successful (step 52) and the procedure 40 returns to step 22. If the Escape algorithm does not find a new slot allocation, the user is dropped, the event is recorded as a "drop" event (step 24) and the procedure returns to step 22. Similarly, in step 26, if the transmission power of a user exceeds the maximum allowed, the Escape algorithm can be invoked for the user and steps 50-52 are entered. Likewise, in step 27, if the total transmission power of a Node B exceeds the maximum allowed, the Escape algorithm can be invoked for the selected user and steps 50-52 are implemented.

It is up to the system designer to determine whether or not the Escape is permitted when the conditions in steps 23, 26 or 27 occur. This may be permitted on a selective bases. For example, one may permit a call to enter the Escape algorithm in the conditions where the interference is exceeded (step 23) or when the total base station power exceeds the maximum (step 27), but possibly not when the user transmission power exceeds the maximum (step 26).

It should be noted that in an actual system application, channel allocation algorithms use values for interference and/or transmission power that are measured by the WTRU and/or Node B, and then report these to the entity which runs the algorithm (e.g. the Remote Network Controller). The measurement process performed by the WTRU or the Node B is not exact due to various factors such as the limited duration of the measurement, or biases in the radio equipment. Therefore, the values used by the channel allocation algorithm will often contain errors with respect to the actual value of the quantity. This error can negatively affect the performance of the algorithm. Accordingly, if a system designer desires to assess the performance degradation of the algorithm due to the errors, a random error may be added to the parameters used by the aforementioned algorithms, (such as interference, power or transmission power), prior to invoking the algorithms in steps 13, 39 or 51. The effect of errors in the measurement of interference levels, path loss and transmission power levels are the modeled by modifying those quantities according to the added errors and using the modified quantities upon invoking the algorithms.

Although the present invention has been described in detail, it is to be understood that the invention is not limited thereto, and that various changes can be made therein without departing from the spirit and scope of the invention, which is defined by the attached claims.

What is claimed is:

1. A method of simulating the performance of a communication system which supports transmissions that are received and transmitted by a plurality of users, the method comprising simulating possible realizations of a system configuration by performing a plurality of snapshots at specific instances of time, wherein the following steps are performed for each snapshot:
   (a) starting a current snapshot with an empty simulated system where no users are present;
   (b) selecting a new candidate user for consideration of admission to the simulated system;
   (c) computing interference levels of the new candidate user;
   (d) invoking a first algorithm to determine whether the new candidate user should be admitted in the simulated system based upon the computed interference levels;
   (e) if the first algorithm determines in step (d) that the new candidate user should be admitted in the simulated system:
      (e1) allocating at least one timeslot to the new candidate user;
      (e2) computing a transmission power level for the new candidate user based on the computed interference levels; and
      (e3) performing a power balancing process to update the transmission power levels of all users admitted in the simulated system;

(f) repeating steps (b)-(e) if there are any additional new candidate users to consider for admission to the simulated system; and (g) ending the current snapshot if there are no more new candidate users to consider for admission to the simulated system.

2. The method of claim 1 further comprising:

(h) invoking a second algorithm using the interference levels of all of the users admitted to the simulated system; and (i) determining whether the timeslot allocation of any user admitted to the simulated system should be modified and, if so, computing the transmission power levels of users affected by the modified timeslot allocation.

3. The method of claim 1 wherein the power balancing process of step (e3) further comprises:

(i) computing an interference level for each user admitted to the simulated system;

(ii) dropping each one of the admitted users having an interference level that exceeds an established interference level threshold; and (iii) recording each occurrence of dropping an admitted user as a "drop" event for the purpose of collecting statistics.

4. The method of claim 1 wherein the power balancing process of step (e3) further comprises:

(i) computing a transmission power level for each user admitted to the simulated system;

(ii) dropping each one of the admitted users having a transmission power level that does not meet an established minimum transmission power level threshold; and (iii) recording each occurrence of dropping an admitted user as a "drop" event for the purpose of collecting statistics.

5. The method of claim 1 wherein if the first algorithm determines in step (d) that the new candidate user should not be admitted in the simulated system, recording a "block" event indicating that the new candidate user should be blocked from connecting to the simulated system and proceeding to step (f).

6. The method of claim 1 wherein each admitted user has a respective quality requirement, the method further comprising:

(h) determining whether each user meets their respective quality requirement.

7. A method of simulating the performance of a communication system which supports transmissions that are received and transmitted by a plurality of users, the method comprising simulating possible realizations of a system configuration by performing a plurality of snapshots of a simulated system at specific instances of time, wherein the following steps are performed for each snapshot:

(a) selecting a new candidate user for consideration of admission to the simulated system, wherein the simulated system is already being used by a plurality of admitted users during a current snapshot of the simulated system;

(b) computing interference levels of the new candidate user based on transmission power levels of the admitted users;

(c) invoking a first algorithm to determine whether the new candidate user should be admitted in the simulated system based upon the computed interference levels and the transmission power levels of the admitted users;

(d) if the first algorithm determines in step (c) that the new candidate user should be admitted in the simulated system:

(d1) allocating at least one timeslot to the new candidate user;

(d2) computing a transmission power level for the new candidate user based on the computed interference levels; and (d3) performing a power balancing process to update the transmission power levels of all users admitted in the simulated system; and (e) repeating steps (a)-(d) if there are any additional new candidate users to consider for admission to the simulated system; and (f) ending the current snapshot if there are no more new candidate users to consider for admission to the simulated system.

8. The method of claim 7 further comprising:

(g) invoking a second algorithm using the transmission power levels of all of the users admitted to the simulated system; and (h) determining whether the timeslot allocation of any user admitted to the simulated system should be modified and, if so, computing the transmission power levels of users affected by the modified timeslot allocation.

9. The method of claim 7 wherein the power balancing process of step (d3) further comprises: (i) computing an interference level for each user admitted to the simulated system;

(ii) dropping each one of the admitted users having an interference level that exceeds an established interference level threshold; and (iii) recording each occurrence of dropping an admitted user as a "drop" event for the purpose of collecting statistics.

10. The method of claim 7 wherein the power balancing process of step (d3) further comprises:

(i) computing a transmission power level for each user admitted to the simulated system;

(ii) dropping each one of the admitted users having a transmission power level that does not meet an established minimum transmission power level threshold; and (iii) recording each occurrence of dropping an admitted user as a "drop" event for the purpbse of collecting statistics.

11. The method of claim 7 wherein if the first algorithm determines in step (c) that the new candidate user should not be admitted in the simulated system, recording a "block" event indicating that the new candidate user should be blocked from connecting to the simulated system and proceeding to step (e).

12. The method of claim 7 wherein each admitted user has a respective quality requirement, the method further comprising:

(g) determining whether each user meets their respective quality requirement.

* * * * *

UNITED STATES PATENT AND TRADEMARK OFFICE
CERTIFICATE OF CORRECTION

PATENT NO. : 7,336,957 B2 Page 1 of 1
APPLICATION NO. : 10/680376
DATED : February 26, 2008
INVENTOR(S) : Marinier et al.

It is certified that error appears in the above-identified patent and that said Letters Patent is hereby corrected as shown below:

At column 5, line 33, before the word "Escape", insert --The--.

At column 6, line 7, after the word "selective", delete "bases" and insert therefor --basis--.

At column 6, line 31, before the word "modeled", delete "the".

IN THE CLAIMS

At claim 10, column 8, line 49, before the words "of collecting", delete "purpbse" and insert therefor --purpose--.

Signed and Sealed this

Fifteenth Day of July, 2008

JON W. DUDAS
*Director of the United States Patent and Trademark Office*